Nov. 18, 1969  C. A. LEFLER ET AL  3,479,020
APPARATUS FOR PRECIPITATING METAL VALUES FROM A
SOLUTION PREGNANT WITH SUCH VALUES
Filed July 11, 1966  2 Sheets-Sheet 1

INVENTORS:
CLARENCE ARTHUR LEFLER
GERALD D. MITTELSTADT
BY: MALLINCKRODT & MALLINCKRODT
ATTORNEYS

Nov. 18, 1969  C. A. LEFLER ET AL  3,479,020
APPARATUS FOR PRECIPITATING METAL VALUES FROM A
SOLUTION PREGNANT WITH SUCH VALUES
Filed July 11, 1966  2 Sheets-Sheet 2
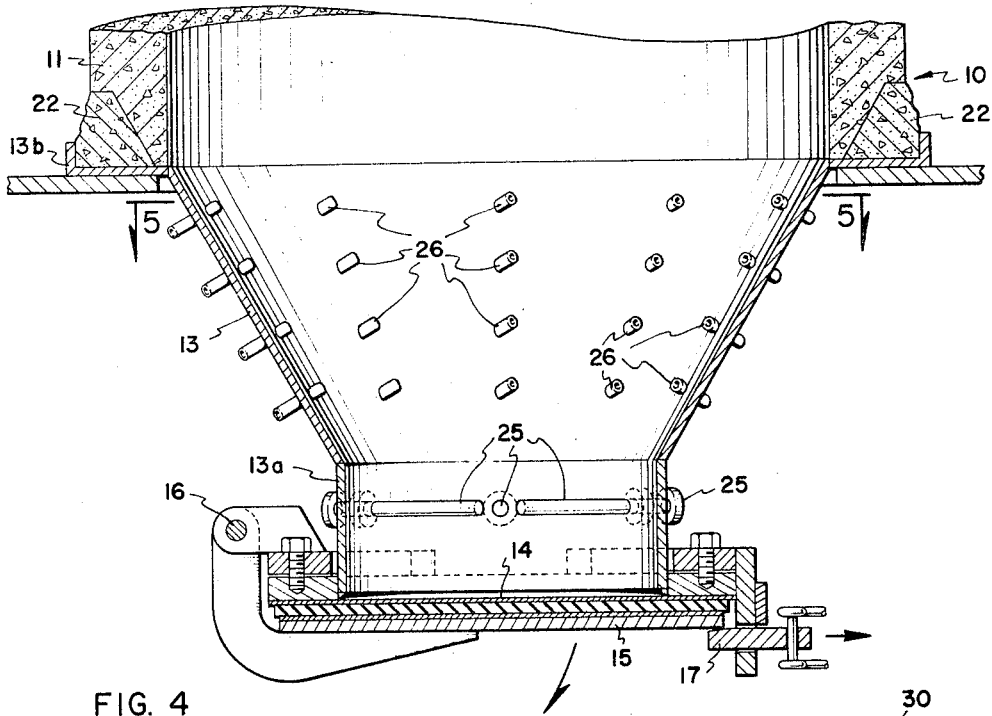
FIG. 4
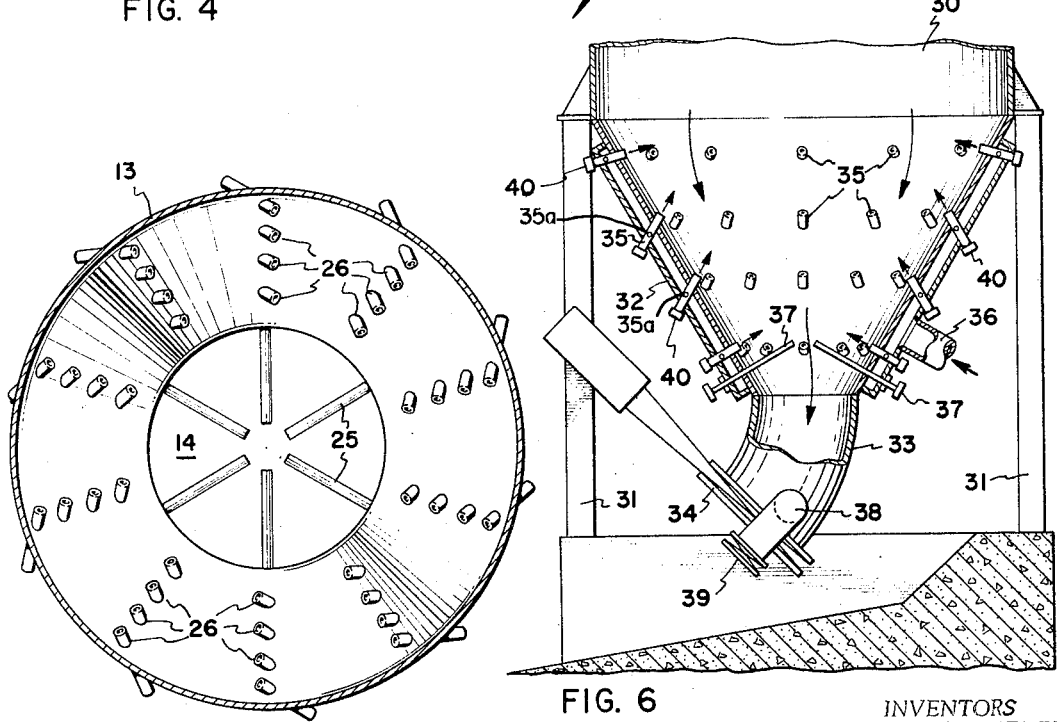
FIG. 5
FIG. 6
INVENTORS
CLARENCE ARTHUR LEFLER
GERALD D. MITTELSTADT
BY: MALLINCKRODT & MALLINCKRODT
ATTORNEYS

United States Patent Office 3,479,020
Patented Nov. 18, 1969

3,479,020
APPARATUS FOR PRECIPITATING METAL VALUES FROM A SOLUTION PREGNANT WITH SUCH VALUES
Clarence Arthur Lefler, Kearny, Ariz., and Gerald D. Mittelstadt, Republic, Mich., assignors to Kennecott Copper Corporation, New York, N.Y., a corporation of New York
Filed July 11, 1966, Ser. No. 564,112
Int. Cl. C22b 3/02; B08b 3/04
U.S. Cl. 266—22       8 Claims

ABSTRACT OF THE DISCLOSURE

Apparatus for contacting massed discrete solids with a liquid, especially for the precipitation of metallic values from solution and particularly for the cementation of copper on metallic iron as a precipitant. The disclosure is of maintaining a column of solids on mutually spaced supporting means and forcibly injecting the liquid against the solids in the lower portion of the column, preferably solely from the periphery of the column, to wash the solids free of reaction products. Massive quantities of liquid, carrying some solid matter, are dropped periodically from the bottom of the column into the atmosphere. It is preferred that the spacing of the supporting means be variable for controlling the discharge of solids during the massive drops of material from the bottom of the column.

---

Figure 1:
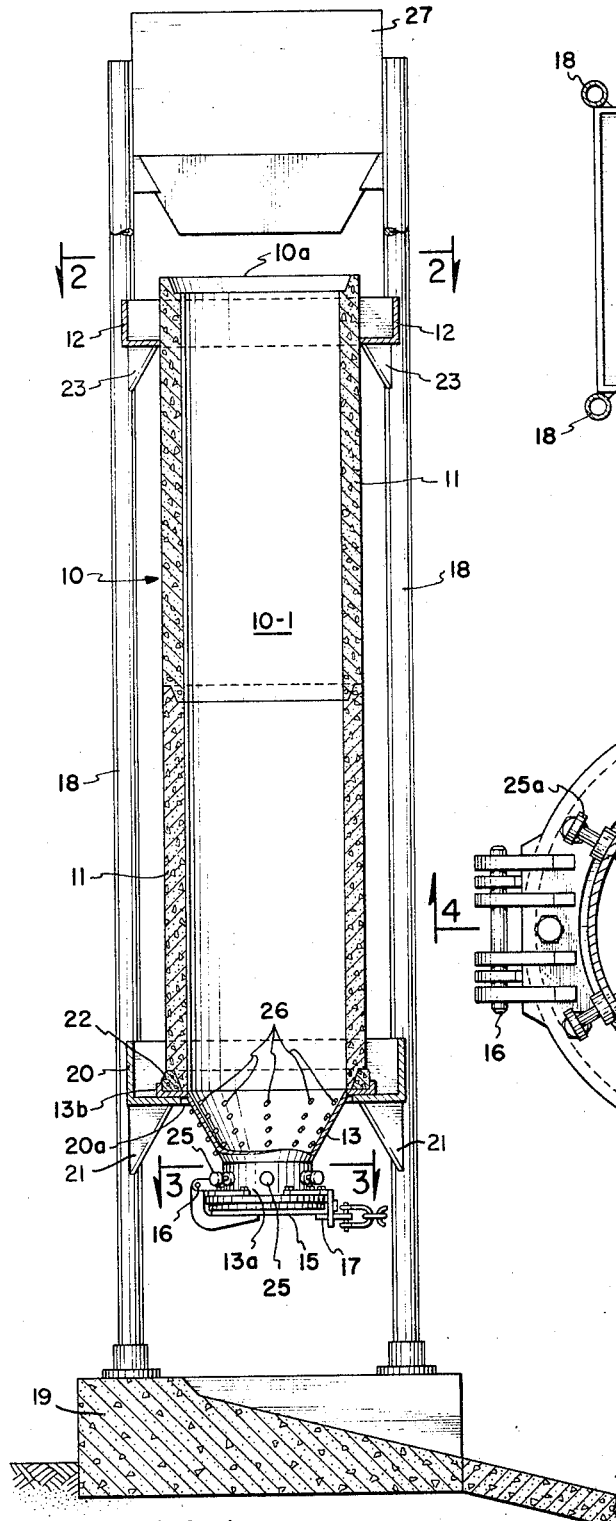

This invention is concerned with apparatus that use a precipitant to recover metal values from a solution that is pregnant with such values. It is especially concerned with the recovery of copper from copper-bearing leach solutions by precipitation on scrap iron.

Precipitation or cementation of copper on metallic iron has long been practiced in the hydrometallurgy of copper. Many different procedures and forms of apparatus for carrying out such procedures have been developed in the past.

It is the particular purpose of the present invention to provide an economical and yet highly effective apparatus for the precipitation of copper on light metallic iron scrap, such as detinned and shredded tin cans and rejects and clippings from can manufacture, or on other forms of metallic iron capable of providing a workable precipitation column.

In the practice of the process or method of the invention forming the subject matter of our copending divisional application, a supply of the precipitant material is maintained as a column in a container that has an open top and a bottom that is normally closed but that can be opened. Pregnant solution, for example, a leaching solution containing copper values, is introduced, preferably under moderate pressure, into the lower end of the column usually immediately above the bottom, to fill the container and to cause an overflow of depleted solution at the top. The solution is preferably introduced as a plurality of jets directed against the lower portion of the column of precipitant, so as to exert a scrubbing action thereon. The precipitation reaction takes place immediately. Thereafter, as the solution rises through the column, it bathes the mass of precipitant material, permitting further reaction and insuring that values are stripped from the solution. In the case of a copper leach solution, surface areas of the scrap iron precipitant are consumed by the reaction, and "cement" copper is formed thereon. Although this tends to slough off and collect at the bottom of the container, some of it clings quite tenaciously to the as yet unreacted iron portions of the precipitant.

Periodically the column is flushed or purged of the precipitated metal values and of a controlled quantity of the partially reacted precipitant. This will normally and desirably also remove unreactive trash materials that may happen to be present. Such flushing or purging of the column is effected by opening the normally closed bottom of the container and permitting a massive, gravity discharge, i.e. drops into the atmosphere, of liquid from the lower portion of the column, while holding the bulk of unreacted precipitant in the column and permitting only lowermost, partially reacted portions to discharge with the outflowing solution. The open top of the container insures immediate dropping of material through the bottom opening.

The relatively small quantity of partially reacted precipitant that is discharge with the flushing liquid and with the precipitate product, is then washed free of precipitate, separated therefrom, and returned, along with additional fresh precipitant, to replenish the supply in the column.

There is no need for discontinuing the introduction of the pregnant solution during the flushing or purging periods, since the incoming jets thereof spray against and wash the lower portion of the column of precipitant and help to dislodge the precipitate metal product, small pieces of unreacted precipitant that tend to clog the column, and any trash materials that may be present.

Apparatus for carrying out the method can be constructed at minimum expense. The columnar container may be quickly and economically fabricated. For the smaller sizes, e.g. up to eight feet inside diameter, two or more lengths of precast concrete pipe are advantageously utilized. For the larger sizes, e.g. ten or more feet inside diameter, some other suitable material, such as sheet stainless steel, need merely be formed into a hollow cylinder open at both ends. The normally closed bottom of the container is preferably provided by a quick-opening valve arrangement, which may be opened and closed manually or by power, preferably pneumatic or hydraulic. A massive and controlled gravity discharge is assured by making the valve opening about one-quarter the diameter of the column or larger and by providing retractable bars as means for holding the bulk of the column of precipitant against discharge during purging periods.

The apparatus illustrated in the accompanying drawings constitute the best mode presently contemplated of carrying out the invention.

Figure 2:
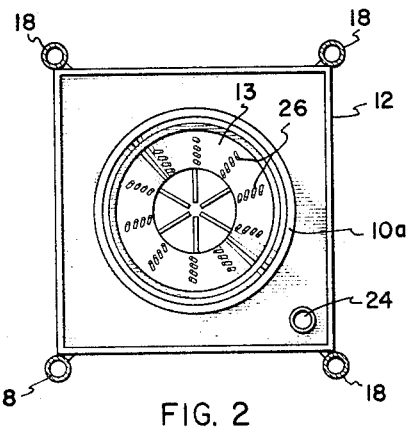
Figure 3:
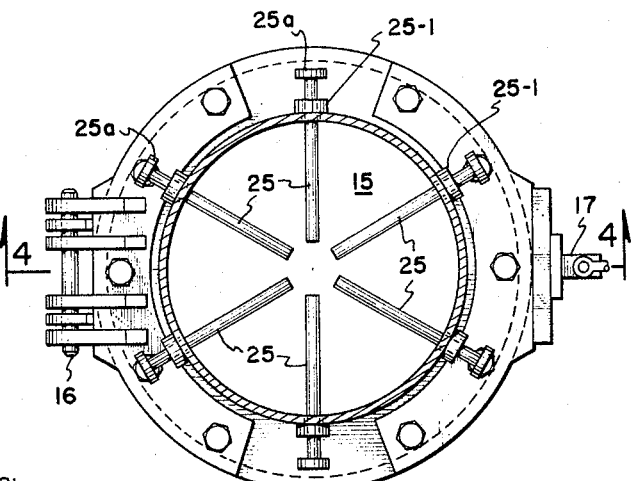

In the drawings:

FIG. 1 is a view of one form of such apparatus in central vertical section, but showing the discharge valve arrangement in elevation;

FIG. 2, a horizontal section taken on the line 2—2 of FIG. 1;

FIG. 3, a horizontal section taken on the line 3—3 of FIG. 1 and drawn to a considerably larger scale;

FIG. 4, a vertical section taken on the line 4—4 of FIG. 3 and including a fragmentary portion of the structure immediately thereabove;

FIG. 5, a horizontal section taken on the line 5—5 of FIG. 4 to show the arrangement of solution-input jet nozzles, the view being drawn to a reduced scale; and FIG. 6, a view corresponding in general to that of FIG. 4 but drawn to a considerably smaller scale and illustrating a somewhat different form of the apparatus of the invention.

Referring to the drawings:

The method of our copending divisional application, especially with respect to the precipitation of copper on scrap iron, is best and most economically carried out by the use of apparatus such as is here illustrated.

The apparatus of FIGS. 1–5 comprises a cylindrical container 10 built up from two lengths 11 of precast concrete pipe joined end-to end in liquid-tight relationship to define an elongate substantially vertical chamber 10-1 for receiving the solid precipitant material and for maintaining it as a precipitation column. The container is open at its top to define a liquid-overflow lip 10a leading into a circumferential launder 12, and is normally closed at its bottom.

At the bottom of container 10 in the illustrated instance is a frustoconical fitting 13 fabricated from either stainless steel or concrete or both and terminating in a cylindrical collar 13a that provides a normally closed bottom discharge opening 14, FIGS. 4 and 5, for the container. For permitting massive, gravity discharges through such bottom opening 14, so as to periodically purge or flush the precipitation column, the diameter of such opening 14 is preferably no less than about one-quarter the diameter of the column, i.e. of the chamber 10–1.

Discharge opening 14 is normally closed by a quick-acting valve, for example, the manually opened and closed, drop-swing door 15, FIG. 4, hinged at 16 and latched at 17. The use of a pneumatically or other power-operated wafer valve of standard construction, see FIG. 6, is advantageous, especially for the larger installations.

Container 10 is supported on four stanchions 18 of steel pipe rising from a concrete footing 19 that is advantageously formed as a catch and discharge basin for the column.

A rectangular platform 20 is secured, as by gusset plates 21 and welding, to the stanchions 18 at a convenient height above footing 19. Frusto-conical fitting 13 extends through a circular opening 20a, centrally of the platform, and is formed with an outwardly projecting, circumferentially rimmed flange 13b about its upper end. This flange rests on portions of the platform 20 marginal to such opening 20a, and not only supports the fitting 13 but also serves to receive and seat the lower end of the lowermost length 11 of concrete pipe making up the cylindrical container 10. A liquid-tight seal 22 is provided between container 10 and frusto-conical fitting 13 by placing and forming a suitable mastic material, such as wet concrete, in the annular pan formation provided by flange 13b.

The launder 12 is also rectangular, and is secured to the stanchions 18 by gusset plates 23 and welding. It is advantageously fabricated from stainless steel, which is fitted as closely as practical to the concrete pipe 11. Calking, epoxy cement, or other suitable sealing means (not shown) is inserted at the joinder to prevent leakage, and a discharge pipe 24, FIG. 2, is provided at one corner of the launder.

The container 10 is adapted to hold a column of light iron scrap (not shown), such as detinned and shredded tin cans, or some other solid precipitant. For this purpose some kind of an open retainer, adapted to afford free passage for the material desired to be discharged, is provided in the collar portion 13a of the frusto-conical fitting above the bottom discharge opening 14 so the supply of iron scrap or other precipitant will be retained in the column and will not be discharged when the valve door 15 is in its open position. For scrap iron in the precipitation of copper from solution, it is preferred that this retainer be formed of a circumferential series of retractable bars 25 extending through packing glands 25–1 in the collar 13a and manually operable from the exterior of such collar by means of knobbed ends 25a.

To permit the forceful injection of pregnant solution into the column for upward flow through the precipitant, so there is continual overflow of depleted solution into the circumferential launder 12, an arrangement of jet nozzles 26 is provided in the frusto-conical portion of the fitting 13 above the retainer bars 25. These nozzles preferably extend through the wall of such fitting 13 from the exterior, for connection with any suitable source of supply of pregnant leach solution, as, for instance, with respective hoses (not shown) so as to be cleanable from the exterior of the fitting. They are preferably angularly and upwardly directed, somewhat as indicated in FIGS. 4 and 5, to project jet streams of pregnant solution from mutually spaced locations at the sides of the frusto-conical fitting upwardly and at angles, i.e. non-radially, against the lower portion of the column of precipitant. The nozzles are preferably so oriented, at substantially uniform, non-radial angles, respectively, relative to the upright axis of the column, as to establish and maintain a swirling movement of the solution within the column in either a clockwise or counterclockwise direction and so that their jet streams will not intersect. The greater the diameter of the column, the more of these jet nozzles required.

It should be realized that the solution rises in the column of precipitant, providing an enveloping and permeating, substantially coextensive, column of liquid that is continually discharging at the top.

The precipitant, usually shredded de-tinned cans in the instance of the precipitation of copper from a copper leach solution, is dropped into the container 10 through its open upper end. A continuous supply is preferably provided from a hopper 27, FIG. 1, that is constantly open to the open upper end of the container, so as to maintain a full column as the precipitant is consumed by the reaction taking place and as the upper part of the column slumps toward the bottom.

The downwardly convergent fitting 13 and the precipitant retainer 25 near the bottom thereof tend to cause bridging of the less-consumed precipitant at or immediately above such retainer, especially in the instance of scrap iron, which bridged precipitant tends to support the column even when the retainer bars are retracted.

For a column having a diameter of eight feet and a container height of sixteen feet, flow rates in the range of from about 600 g.p.m. to about 1000 g.p.m. or higher (utilizing forty jet nozzles in a frusto-conical fitting which reduces the column diameter from eight to two and a half feet along a sixty degree slope) at an input pressure in the range of from about 20 to about 30 p.s.i. produce satisfactory results in the production of precipitate copper utilizing light iron scrap as the precipitant. The optimum flow rate and input pressure to be used in any particular instance must be determined by observation of all the operating parameters. One of the most important factors is the amount of metal value in the pregnant solution. Generally, a high content in the input solution of the metal to be recovered indicates that a low flow rate should be used, and vice versa, in order to maintain a substantially constant rate of production.

The solution input pressure should be such that a scrubbing action on the precipitant within the column is achieved, whereby particles of precipitate are removed from surfaces of the precipitant so that fresh surfaces are constantly presented to the solution for continued reaction.

The column of precipitant is periodically purged to eliminate accumulated precipitate. This is done by opening the door 15, usually momentarily. This permits any desired portion or even all of the liquid in the column to discharge by gravity from the bottom of the column, flushing out the precipitate accumulated in the lower portion of the column, some of the partially reacted precipitant at the bottom of the column, and trash that may be present. The discharge of from 10 to 20 percent of the solids in the column is usual.

The precipitate and any unreacted precipitant flushed from the column at each purging thereof are recovered in the catch basin 19, while the flushing liquid is drained off through a screen or by means of a rotating trommel or the like (not shown). A pressure spray of wash water is advantageously used to wash the precipitate from the unreacted precipitant and to separate it from both the latter and the trash. In the instance of iron as the precipitant, it is conveniently separated from the trash by means of a magnetic separator and is returned to hopper 27 along with fresh iron.

The following table shows test results over prolonged operating periods of the apparatus illustrated in FIGS. 1 to 5 wherein copper is precipitated on a column of light scrap iron from an acidic leach solution:

| No. days | G.p.m. | Lb./M gallon | | Percent recovery | Soluble iron factor |
|---|---|---|---|---|---|
| | | Heads | Tails | | |
| 9 | 672 | 8.39 | 0.30 | 96.4 | 1.10 |
| 21 | 726 | 6.25 | 0.45 | 92.8 | 1.30 |
| 5 | 819 | 6.00 | 0.31 | 94.8 | 1.35 |
| 8 | 930 | 5.36 | 0.41 | 92.4 | 1.58 |
| 10 | 1,218 | 5.47 | 0.54 | 90.1 | 1.52 |
| 8 | 754 | 4.97 | 0.38 | 92.4 | 1.54 |
| 4 | 940 | 5.58 | 0.39 | 93.0 | 1.42 |
| 3 | 782 | 9.27 | 0.77 | 91.7 | 1.17 |
| 68 [1] | [2] 840 | [2] 6.24 | [2] 0.43 | [2] 93.1 | [2] 1.37 |

[1] Total.
[2] Average.

In the embodiment of apparatus shown in FIG. 6, a cylindrical container 30 of stainless steel, usually 10 feet or more in diameter, is supported by legs 31 and has a frusto-conical fitting 32 terminating in a stainless steel discharge elbow 33 provided with a power-operated wafer valve 34 of conventional construction. The fitting 32 is hollow-walled as a supply manifold for jet nozzles 35 and has pregnant solution supplied to it by a feed conduit 36. Communication between nozzles 35 and the hollow, manifold interior of fitting 32 is established by respective openings 35a. Retractable bars 37 are directed upwardly toward a common level on the discharge axis to provide a retainer for the scrap iron precipitant. A smaller elbow 38 branches off from the elbow 33 and is provided with its own independently operable wafer valve 39 for bleeding off accumulated precipitate at intervals between purgings of the precipitation column in container 30, thereby lengthening the periods between successive purgings. The jet nozzles are cleaned by removing pipe caps 40.

By reason of collecting and discharging the precipitate at the bottom of the column, rather than carrying it to discharge at or near the top, the pregnant solution can be introduced at relatively low pressure (20 to 30 p.s.i.) and a cylindrical column can be utilized, rather than one of outwardly flaring, conical shape. Massive discharge of solution from the bottom of the column and controlled retention of precipitant, with some discharge thereof at each purging, are significant features of the invention. It should be noted that the column of precipitant serves both as a scavenger section to strip values from the rising solution and as a filter to prevent carrying of precipitate to overflow, and that the jet streams not only clean the surfaces of the precipitant, but agitate the material in the reaction zone and contribute to crystal growth.

It should be understood that the illustrated form of the apparatus merely represents the best mode presently contemplated for carrying out the invention, and that other forms are possible.

We claim:

1. Apparatus for continuously contacting massed discrete metallic iron solids with a copper-containing solution, comprising
    a container for receiving and holding a column of said massed discrete metallic iron solids and said solution in close reacting contact with each other;
    means within the lower portion of the container for forcibly injecting said solution into the lower portion of said column of solids to scrub the surfaces of and agitate the solids contacted thereby;
    overflow means at an upper level of the container for discharging solution from the column following contact with solids in the column;
    mutually spaced means adjacent to but above the bottom of the container and below said injecting means for supporting the said massed solids in the column;
    means at the bottom of the container for periodically dropping, from said container and into the atmosphere, a massive quantity of material; and
    means opening the upper end of said column to the atmosphere during said periodic dropping.

2. Apparatus in accordance with claim 1, wherein the means for injecting solution into the container comprise a plurality of jet nozzles arranged solely about the walls of the container at the lower end thereof and peripherally of the column, and having their discharge openings directed angularly and upwardly with respect to the column radius to inject solution into the column of solids in non-intersecting jet streams and to impart a swirling motion to solution within the container.

3. Apparatus in accordance with claim 1, wherein the rear ends of the jet nozzles extend exteriorly of the container to afford access for cleaning.

4. Apparatus in accordance with claim 2, wherein the jet nozzles extend through the header in common into which they open for the supply of solution thereto.

5. Apparatus in accordance with claim 1, wherein the supporting means are constructed and arranged to have the extent of the mutual spacing varied at will, so discharge of solids from the bottom of the column can be controlled.

6. Apparatus in accordance with claim 4, wherein the supporting means are retractable bars.

7. Apparatus in accordance with claim 4, wherein the retractable bars are radially disposed and converge on an upward slope, so as to induce bridging of the solids immediately thereabove.

8. Apparatus in accordance with claim 1, wherein an elbowed discharge fitting is connected to the botom of the container; the valve means is a power-actuated wafer valve closing the lower end of said fitting; and there is additionally provided a valved discharge branch leading from said fitting above said wafer valve.

References Cited

UNITED STATES PATENTS

| 528,023 | 10/1894 | Pelatan et al. | 266—12 |
| 597,372 | 1/1898 | Donohue et al. | 266—22 |
| 853,575 | 5/1907 | Boileau | 266—12 |
| 3,200,067 | 8/1965 | Levendusky | 210—189 X |
| 689,835 | 12/1901 | Waterbury | 75—101 X |
| 3,373,984 | 3/1968 | Valle | 266—12 |

FOREIGN PATENTS

| 2,407 | 2/1901 | Great Britain. |
| 40,202 | 3/1937 | Netherlands. |

J. SPENCER OVERHOLSER, Primary Examiner

R. S. ANNEAR, Assistant Examiner

U.S. Cl. X.R.

134—199; 210—189